INVENTORS
G.L. TURNER
C.H. HARRIS
BY Roy A. Plant
ATTORNEY

INVENTORS
G.L. TURNER
C.H. HARRIS
BY Roy A. Plant
ATTORNEY

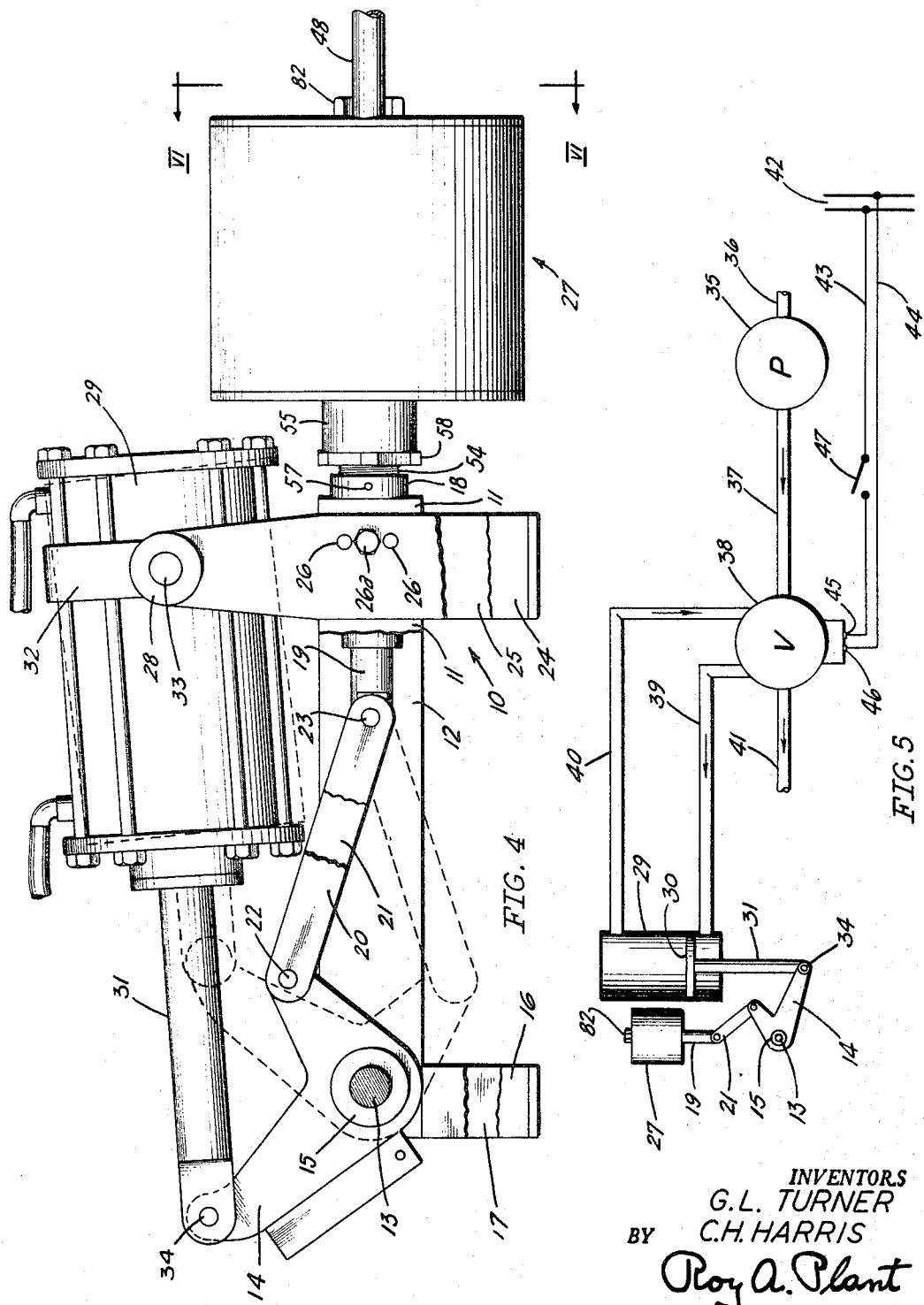

3,348,292
APPARATUS FOR MOUNTING HOSE COUPLINGS
George L. Turner, Hickory Corners, and Carl H. Harris, Battle Creek, Mich., assignors to H. B. Sherman Manufacturing Company, Battle Creek, Mich., a corporation of Michigan
Filed Feb. 7, 1964, Ser. No. 343,317
4 Claims. (Cl. 29—237)

The present invention relates broadly to the hose coupling mounting art, and more specifically to an apparatus for mounting a hose coupling half on the end of a piece of hose by a double anchoring procedure.

While for many years hose couplings were mounted on the end of a piece of hose by means of a hose clamp, this gradually gave way to crimping a ferrule on the outer face of the hose end to clamp same to the coupling nipple. Later it was recognized that this resulted in a choking action on the flow of liquid through the hose since the coupling nipple was universally smaller than the bore of the house mounted on same. To overcome this, the practice developed of clamping the coupling halves on the hose solely by expanding the coupling nipple against the inside of the hose to bind the hose against an outside coupling ferrule. A modification of the latter was to make the nipple larger so as to slip over the outer face of the hose end, and a ferrule, slipped in the inside of the end of the hose, was expanded out to force the hose end against the outside nipple of the coupling to accomplish the same end. These various procedures worked well on conventional fabric reinforced rubber hose, but with the advent of plastic or plastic-faced rubber hose, difficulties were encountered. Such difficulties, in general, arose from the fact that the plastic used in such hose is flowable to a limited extent and particularly so when warm or hot from lying in the sun, and also because this plastic is slippery when wet. It was a recognition of the shortcomings of the prior commercial practices in mounting hose coupling halves on the end of pieces of hose, and the need of an improved hose coupling mounting procedure and apparatus which led to the conception and development of the present invention.

Accordingly, among the objects of the present invention is the provision of an improved apparatus for mounting house coupling halves on the ends of hose members in rapid and efficient commercial manner.

Another object is to provide a hose coupling mounting apparatus wherein a unidirectional movement is converted into movements which both crimp the outer portion of a coupling half and simultaneously expand the inner portion of the coupling half to positively lock the coupling half in place on the end of the hose.

A further object is to provide a fluid pressure actuated piston and cylinder assembly wherein movement of the piston carrying rod in one direction carries out the complete coupling mounting cycle of crimping the outside of the coupling half and simultaneously expanding the inside of the coupling half followed by retraction of the crimping and expanding members to release the coupling half mounted on the end of the piece of hose ready for repeating the same cycle due to the movement of the piston rod in reverse direction.

A further object is to provide a toggle action mechanism which actuates the crimping and expanding members so that maximum mounting pressure is exerted at the end of the expanding and crimping operative movement, and before the retraction starts which releases the coupling half mounted in place on the end of a piece of hose.

Still further objects and advantages of the invention will appear as the description proceeds.

To the accomplishment of the foregoing and related ends, the invention, then, consists of the means hereinafter fully described and particularly pointed out in the claims, the annexed drawings setting forth in detail certain means and one mode of carrying out the invention, such disclosed means and mode illustrating, however, but one of the various ways in which the principle of the invention may be used.

In the annexed drawings:

FIGURE 4 shows diagrammatically, on a reduced scale, a preferred assembly of the equipment, with one of the assembly members of this invention in fixed position with the piston and cylinder assembly operably connected thereto.

FIGURE 5 diagrammatically shows a simple form of the fluid and electrical operating circuits which actuate the mechanism, including the assembly member of this invention which mounts the hose coupling on the end of a section of hose.

Figure 6:
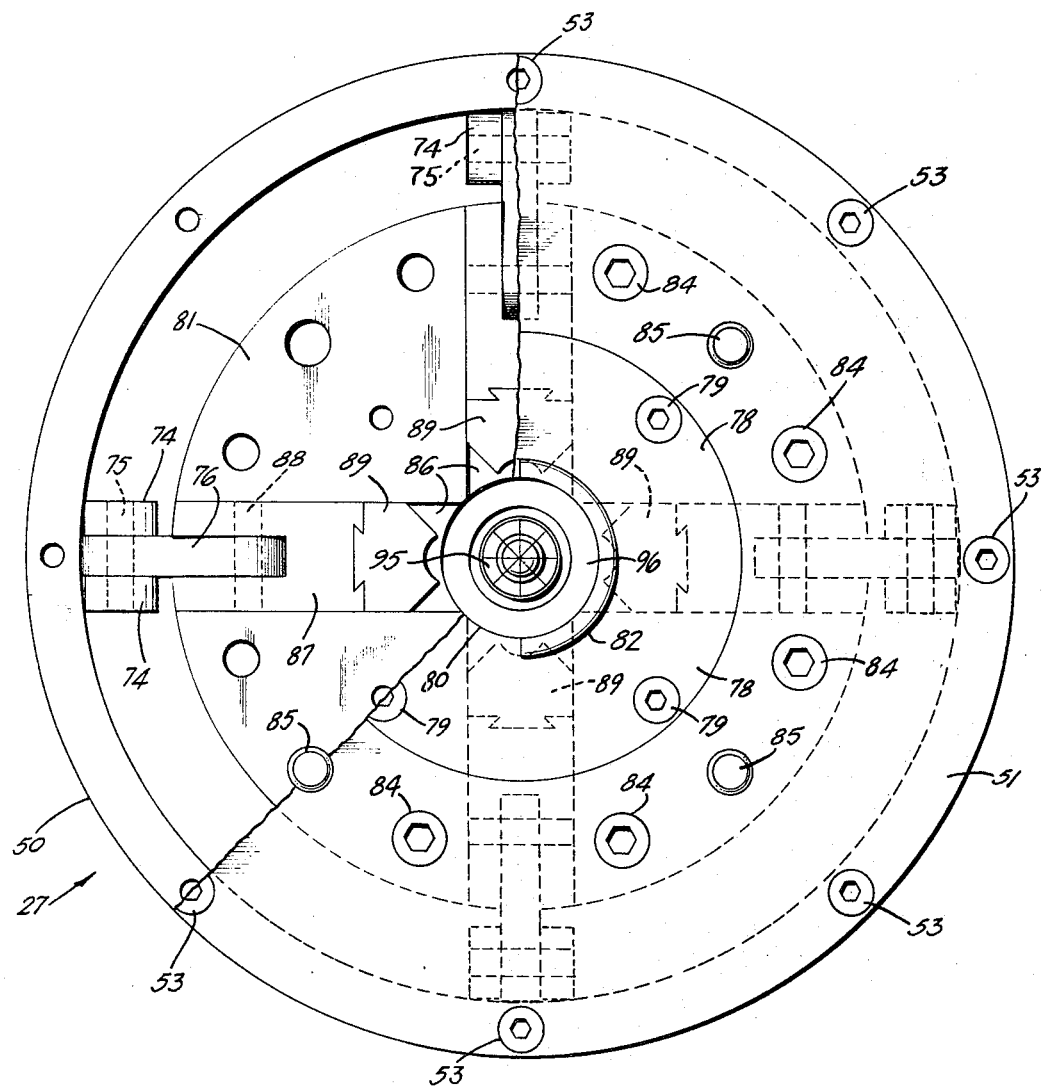

FIGURE 6 shows an end view of the house coupling mounting assembly, partially broken away to show some of the inner construction, as seen along line VI—VI of FIGURE 4, looking in the direction of the arrows.

Referring more particularly to FIGURE 4 of the drawings, it will be noted that there is a supporting frame 10 which has a pair of side members 11 and 12 on opposite sides of actuating members which will be hereinafter described. The outer end of each of the side members 11 and 12 are joined together by a shaft 13 carrying a bell crank 14 with space washers 15 on said shaft and on opposite sides of said bell crank. Mounted on and fastened to the outer end of side member 12 is a supporting foot member 17, and a like supporting foot member 16 is mounted on and fastened to side member 11 substantially parallel to supporting foot member 17.

At the inner end of side members 11 and 12, FIGURE 4, there is a guide member support 18 mounted between same so as to not only support the guide member 54 which guides operating shaft 19 in its endwise movements under operating conditions, but also to space side members 11 and 12 apart so that links 20 and 21 connected by pivot pins 22 and 23, respectively, to bell crank 14 and operating shaft 19, will have room to freely move therebetween. At the end of side members 11 and 12 carrying guide member 18, they are provided with a pair of supporting feet 24 and 25. These supporting feet may be joined in conventional manner to side members 11 and 12 by means of pins 26 and cap screws 26a, and if desired they may also anchor guide member 18 in place, and it is intended that the drawing be considered as diagrammatically illustrating same. The assembly member 27 may be operatively mounted on guide member 18, with one way of doing so being shown in FIGURE 1, as will be hereinafter described in detail.

The upper end of supporting foot members 24 and 25, FIGURE 4, are provided with trunnion bearings 28. A double acting cylinder 29 with piston 30, FIGURE 5, and piston rod 31, are supported on trunnion bearings 28 by means of a ring 32, FIGURE 4, carrying trunnions 33 which operably fit said trunnion bearings. This ring is fastened to cylinder 29 in any conventional manner, such as by welding, brazing, or the like. The end of bell crank 14 opposite to that carrying pivot pin 22 is pivotally connected by a pivot pin 34 to the outer end of piston rod 31. It is thus to be seen that when piston 30 moves from the left-hand end of the cylinder 29 to the other end, FIGURE 4, it pivots bell crank 14 from the solid line position to the dashed line position, or vice versa, when the piston moves in the opposite direction, and in doing so moves operating shaft 19 to the right and then back to the left, the effect of which will be hereinafter described in detail.

Now referring to FIGURE 5, it will be noted that there is a source of operating fluid under suitable pressure, such as supplied by pump 35 or the like, which receives said fluid through pipe 36, with such fluid under suitable pressure operating piston 30 in double acting cylinder 29. This operating fluid is delivered through pipe 37 to a conventional four-way valve 38 which, for instance, connects pipe 37 to pipe 39 which in turn is connected to one end of double acting cylinder 29 to force piston 30 toward the opposite end of said cylinder. The fluid in cylinder 29 at the opposite side of piston 30 is forced out through pipe 40 and four-way valve 38, and is discharged through waste pipe 41. A preferred form of the four-way valve 38 is one which is electrically operated, wherein solenoids or the like (not shown) rotate the valve mechanism from one operating position to a second operating position in reversible sequence. Here a suitable source of electrical power 42 is connected by wires 43 and 44 to terminals 45 and 46 of the electrically operated four-way valve 38 with one of those wires, for instance 43, having a switch 47 in same. With the valve 38 connected for flow of operating fluid as shown by the arrows in FIGURE 5, piston 30 will move to the opposite end of cylinder 29 and stop. During this movement of the piston, its piston rod 31 will pivotally move bell crank 14 from one end of its travel to the other which will actuate operating shaft 19 which will anchor a hose coupling half on the end of a piece of hose 48, and then release same for removal and repeating of the cycle as will be hereinafter described in detail. The apparatus is now ready for repeating the hose coupling mounting procedure, and wherein again momentarily closing switch 47 will electrically actuate four-way valve 38 so that the operating fluid flowing through pipe 37 will pass through valve 38 into pipe 40 and into the end of cylinder 29. At the same time the fluid under pressure on the opposite side of piston 30 will start to flow out through pipe 39 and valve 38 into waste pipe 41 the moment that the valve 38 is actuated. This flow of fluid out of waste pipe 41 will continue until piston 30 reaches the end of its travel during which the movement of piston rod 31 will actuate bell crank 14 in the opposite direction from one end of its travel to the other, which will again actuate operating shaft 19 to anchor a hose coupling half, FIGURE 3, on the end of a piece of hose 48, and then release same for removal and repeating of the cycle when switch 47 is again actuated.

Figure 1:
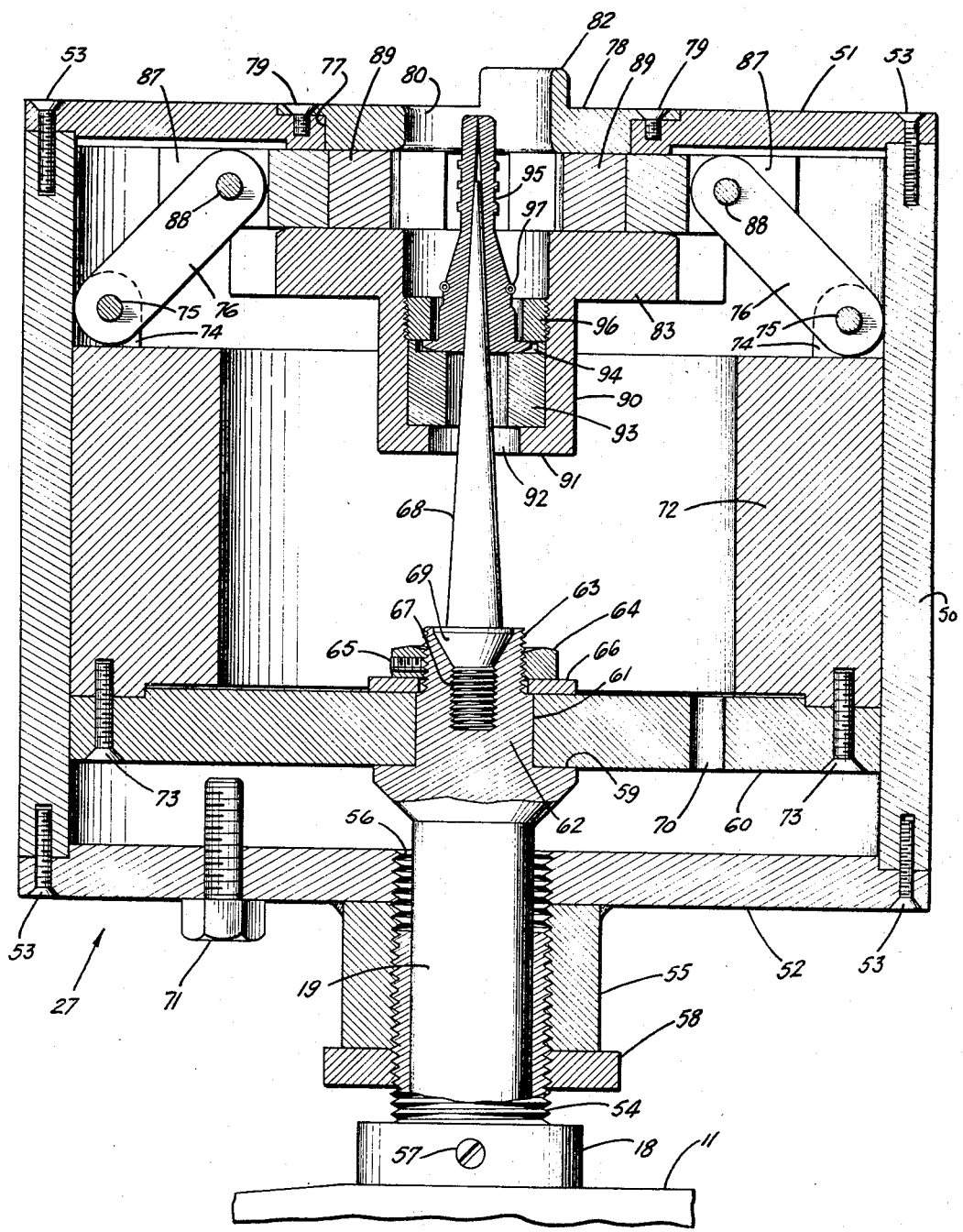
FIGURE 1 shows an enlarged longitudinal center section of the assembly member of this invention carrying the crimping and expanding members in retracted position.
Figure 3:
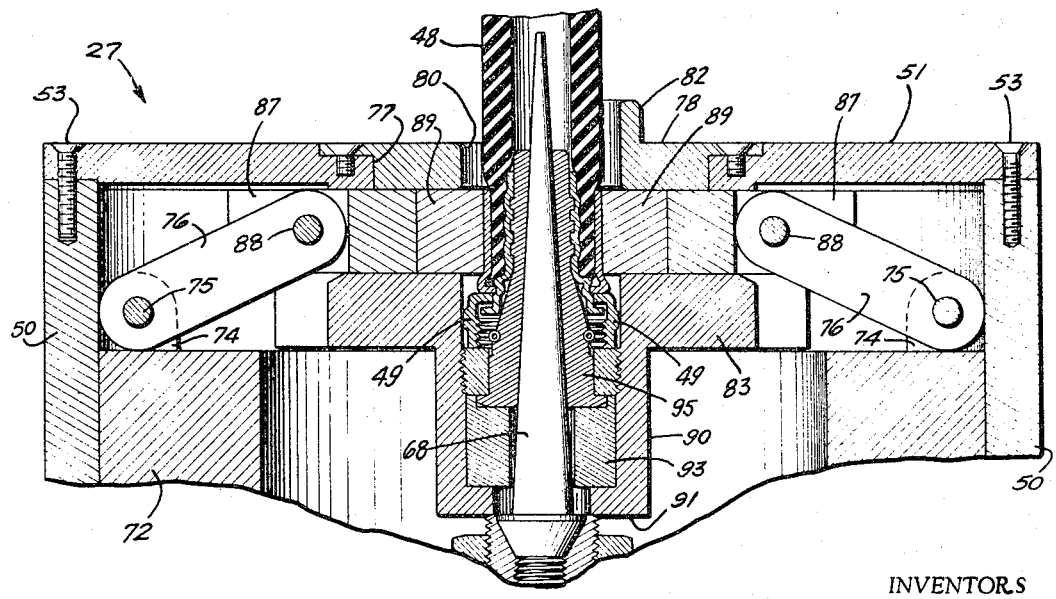
FIGURE 3 shows the upper portion of the assembly illustrated in FIGURE 1 with a hose coupling half mounted on the end of a section of hose, and with the crimping and expanding members in full crimping and expanding position.

The assembly member 27 for mounting a hose coupling 49 on the end of a piece of hose 48 is shown in detail in FIGURES 1 and 3. Here it will be noted there is a cylindrical housing 50 having end members 51 and 52 fastened therein in conventional manner such as by means of machine screws 53. Substantially centered on the end of end member 52 is a sleeve 55 with this sleeve and end member 52 preferably being provided with internal threads 56. Sleeve 55 may be anchored to end member 52 in any conventional manner such as by welding or brazing. It is intended that the showing be considered to diagrammatically illustrate the various ways of joining sleeve 55 to end member 52. Guide member 54 is preferably threaded on one end to threadedly engage both guide member support 18 and sleeve 55 so as to anchor the hose coupling mounting assembly 27 rigidly on guide member support 18 which in turn is anchored to the supporting feet 24 and 25, FIGURE 4. Guide member 54 is preferably anchored in fixed position to guide member support 18 by means of a setscrew 57. Guide member 54 is also preferably anchored against rotation in sleeve 55 by means of a nut 58. Operating shaft 19, which is connected by pivot pin 23 to links 20 and 21 thus is free for endwise sliding through guide member 54 in accordance with the operation of the present invention. The end of operating shaft 19, FIGURE 1, inside of the hose coupling mounting assembly 27 is preferably enlarged and provided with a shoulder 59 to support the side of disk member 60 which is provided with a counterbore 61 for receiving the reduced diameter end 62 of the operating shaft 19. The inner end of operating shaft 19 is preferably provided with threads 63 for engagement with a nut 64 which can be locked in place by means of a setscrew 65. If desired, a washer 66 can be placed between disk member 60 and nut 64 as shown. The inner end of operating shaft 19 is preferably concentrically counterbored and provided with threads 67 for engagement with the corresponding threaded end of a bayonet member 68. The counterbored end of an operating shaft leading to threads 67 is preferably conically bored to receive a conical end portion 69 of bayonet member 68 to accurately line up the latter co-axially with operating shaft 19 for a purpose to be hereinafter described. Disk member 60 is preferably provided with a perforation 70 to permit flow of air therethrough as disk member 60 is moved endwise under conditions of operation of the overall apparatus. End member 52 of the hose coupling mounting assembly 27 is also preferably drilled and threaded for the reception of a cap screw 71, the inner end of which serves as a stop for disk member 60 in its movement toward said end member.

Mounted on disk member 60, FIGURE 1, and slidable therewith inside of cylindrical housing 50 is a cylindrical ring 72. This ring is conventionally anchored to disk member 60 such as by means of machine screws 73. At the end of cylindrical ring 72 opposite to that joined to disk member 60 are several ears 74. These ears 74 are connected by pivots 75 to links 76, the operation of which will be hereinafter described.

End member 51, FIGURES 1, 3 and 6, has a large central opening 77 into which is fitted a die cover plate 78, with the two being fastened together by means of screws 79. This die cover plate 78 has a central opening 80 through which the end of hose 48 with a hose coupling half 49 may be inserted for anchoring thereon as shown in FIGURE 3. As an aid to ease of insertion of the end of the piece of hose 48 with the coupling half 49 thereon into central opening 80, a semi-circular outward projecting flange 82 is preferably used alongside one edge of said central opening 80 where it serves as a stop to guide the coupling half carrying the hose end into said opening.

Referring now to FIGURES 1, 3 and 6, there are segmental plates 81 resting against the inner face of end member 51 on one side and against the side of expander mounting plate 83 on the other. End member 51, segmental plates 81 and expander mounting plate 83 are conventionally held tightly together by means of screws 84 which threadedly engage plate 83. Aligning pins 85 may be used if desired to facilitate the assembly of segmental plates 81 and expander mounting plate 83 on end member 51. There is a slot 86 at each side of the segmental plates 81 for guiding a bifurcated slide member 87 in its back and forth movements under operating conditions. Link 76 is pivotally connected to bifurcated slide member 87 by means of a pivot pin 68 for actuating said bifurcated slide member 87 from its substantially fully retracted position in FIGURE 1 to its extended position as shown in FIGURE 3. Mounted on the end of bifurcated slide member 87 adjacent central opening 80 in conventional manner, such as by dovetailing, is an outside crimping die 89 for crimping the outside ferrule of the hose coupling half 49 as shown in FIGURE 3.

Expander mounting plate 83, FIGURE 1, has an extending counterbored portion 90 with an inturned end flange 91 having an opening 92 for the free passage back and forth of bayonet member 68. Resting on the inner face of end flange 91 is a ring spacer 93 with a shallow internal counterbore 94 to receive and stabilize the outturned end flange of the expansion fingers 95 which are taper bored for the reception of the tapered end of bayonet member 68. The counterbored portion 90 of expander mounting plate 83 is internally threaded above ring spacer 93 for the reception of externally threaded ring 96 for threadedly holding ring spacer 93 in place while allowing the expansion fingers 95 to move sidewise with substantially no endwise movement. A circular coil spring or the like 97, is preferably used to normally hold the expansion fingers 95 in retracted position as shown in FIGURE 1, while allowing them to be expanded as shown in FIGURE 3.

Figure 2:
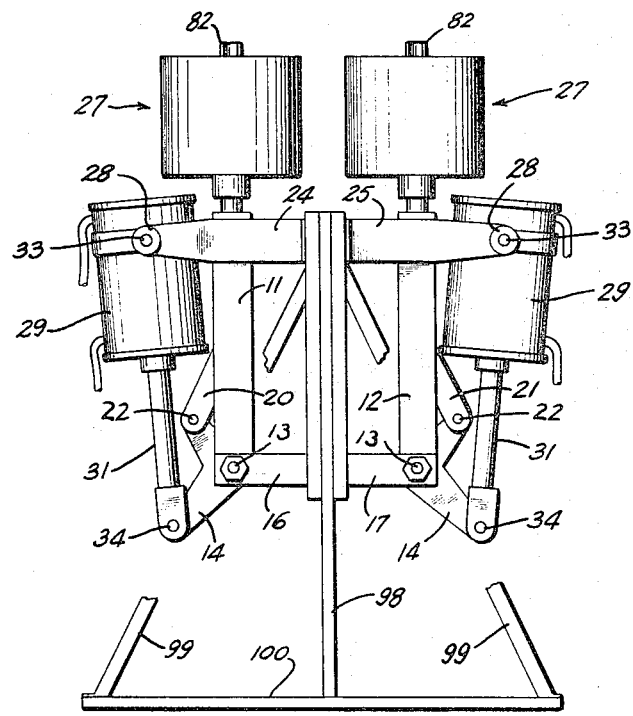
FIGURE 2 shows diagrammatically on a reduced scale a preferred assembly of the equipment, with two of the assembly members shown in fixed position so that a single employee can operate the mechanism and simultaneously mount two hose coupling halves at once on the ends of sections of hose.

Referring more particularly to FIGURE 2, it will be noted that here two of the hose coupling mounting machines are mounted base to base on a main frame 98 having braces 99 extending from the upper portion of the main frame to the outer end portions of base 100 to stabilize the assembly. When the apparatus is assembled in this manner one operator can simultaneously mount two hose coupling halves at one time, such, for instance, the male and female coupling halves used on opposite ends of a single piece of hose.

The operation of the apparatus is as follows:

With the apparatus in retracted position as shown in FIGURE 1, a piece of hose 48 with a hose coupling half 49 mounted thereon is slipped in place over expansion fingers 95 and between outside crimping dies 89. The apparatus is then ready for carrying out the crimping operation, whereupon the operator momentarily closes switch 47 to actuate valve 38, FIGURE 5, and thus deliver fluid under operating pressure to double acting cylinder 29 through pipe 39. The movement of piston 30 to the opposite end of cylinder 29 actuates bell crank 14 to move operating shaft 19 to the end of its forward travel and then back to starting position. This movement of operating shaft 19 pushes bayonet member 68 between expansion fingers 95 to expand them outward as shown in FIGURE 3, and at the same time to move the outside crimping dies 89 inward, thus fastening the hose coupling half 49 on hose 48 and with the reverse movement of operating shaft 19 returning the apparatus to starting position, ready for removal of the mounted coupling half and then mounting the next hose coupling half on the end of another piece of hose.

Other modes of applying the principle of our invention may be employed instead of those explained, change being made as regards the means herein disclosed, provided those stated by any of the following claims or their equivalent be employed.

We therefore particularly point out and distinctly claim as our invention:

1. In a machine for mounting a hose coupling half on the end of an appropriate diameter piece of hose, the combination which includes a frame, a cylindrical housing, means anchoring said housing to said frame, means inside said housing and slidable lengthwise thereof, a separate means inside of said housing and fixed to same at one end thereof for receiving said hose end with said hose coupling half thereon in position for crimping the outer portion of said coupling half against the outer surface of said hose, and an expander within said separate means and extending inside said coupling half in position for expanding the inner portion of said coupling half against the inside of said hose end, a bayonet expanding member operably fitting and movable axially of said expander, means connecting said bayonet expanding member to said lengthwise slidable means inside said housing, link means connecting said crimping means to said lengthwise slidable means inside said housing so that endwise movement of the latter will not only operably move said bayonet expanding member but also will actuate said link means to convert endwise movement of said lengthwise sliding means to operable crosswise movement of said means for crimping the outer portion of said coupling half against the outer face of said hose end.

2. In the apparatus for mounting a hose coupling half on the end of an appropriate diameter piece of hose as set forth in claim 1, wherein said crimping and expanding means during the crimping and expanding movement of same will force the inner and outer portions of said coupling half respectively against the outer and inner faces of the end of said piece of hose at substantially the same time.

3. A machine for mounting a hose coupling half on the end of an appropriate diameter hose which includes in combination a frame assembly, a cylindrical housing mounted on said frame assembly, means inside of said housing slidable lengthwise thereof, means inside of said housing at one end thereof for receiving said hose end and hose coupling half in position for anchoring thereto, means inside said housing for crimping the outer portion of the latter against the outer surface of the former, an expander within said housing operably fitting inside said coupling half in position for expanding the inner portion of said coupling half against the inside of said hose end, a bayonet expanding member operably fitting said expander, means connecting said bayonet expanding member to said means inside said housing and slidable lengthwise thereof, link means connecting said crimping means to said slidable means inside said housing so that endwise movement of the latter will not only operably move said bayonet expanding member but will also substantially simultaneously actuate said link means to convert endwise movement of said lengthwise sliding means to operable crosswise movement of said means for crimping the outer portion of said coupling half against the outer face of said hose end, a power supply means in the form of a double acting piston and cylinder assembly having an extending piston rod, means pivotally mounting said cylinder assembly on said frame, a bell crank pivotally mounted on said frame, means pivotally connecting the outer end of said piston rod to one end of said bell crank for operably moving same, a link including means connecting the other end of said bell crank to said means inside of said cylindrical housing which is slidable lengthwise thereof, said piston rod and means connecting said bell crank to said inside of said cylindrical housing and slidable endwise thereof being positioned so that the movement of said piston in said piston and cylinder assembly from one end to the other will move said hose coupling half crimping and expanding means to full operating position and then back to starting position, and means for reversibly actuating said piston in said piston and cylinder assembly.

4. A machine for mounting a hose coupling half having inner and outer gripping portions on the end of an appropriate diameter piece of hose, which includes in combination a socket including means for fixed position receiving and holding the end of a piece of hose carrying an unanchored coupling half ready for anchoring, a crimping means fitting over the outer hose gripping portion of said coupling half, an expanding means fitting into the inner hose gripping portion of said coupling half, toggle action means for actuating both said crimping means and said means actuating said expanding means, power supply means, and means operably connecting said power supply means to both said crimping means and said expanding means for actuating same to anchor said coupling half on said hose end while both said hose and coupling half remain stationary, wherein said means actuating said crimping means includes a linkage converting lengthwise movement to crosswise movement while progressively increasing the crimping leverage as maximum crimping position is approached.

References Cited

UNITED STATES PATENTS

| | | | |
|---|---|---|---|
| 758,195 | 4/1904 | Schweinert et al. | 29—237 X |
| 807,738 | 12/1905 | Fullerton et al. | 29—237 |
| 2,258,919 | 10/1941 | Wallace | 72—399 |
| 2,324,982 | 7/1943 | Kuhn | 72—399 |

WILLIAM FELDMAN, *Primary Examiner.*

J. C. PETERS, *Assistant Examiner.*

UNITED STATES PATENT OFFICE
CERTIFICATE OF CORRECTION

Patent No. 3,348,292                              October 24, 1967

George L. Turner et al.

It is hereby certified that error appears in the above numbered patent requiring correction and that the said Letters Patent should read as corrected below.

Column 4, line 1, for "therein" read -- thereon --; column 5, line 6, for "68" read -- 88 --.

Signed and sealed this 19th day of November 1968.

(SEAL)
Attest:

Edward M. Fletcher, Jr.                        EDWARD J. BRENNER
Attesting Officer                                   Commissioner of Patents